(12) United States Patent
Yamaya

(10) Patent No.: US 6,664,753 B2
(45) Date of Patent: Dec. 16, 2003

(54) APPARATUS OF CONTROLLING TO ROTATE STEP MOTOR

(75) Inventor: Daisuke Yamaya, Chiba (JP)

(73) Assignee: Seiko Instruments Inc., Chiba (JP)

( * ) Notice: Subject to any disclaimer, the term of this patent is extended or adjusted under 35 U.S.C. 154(b) by 0 days.

(21) Appl. No.: 10/153,535

(22) Filed: May 22, 2002

(65) Prior Publication Data
US 2002/0180396 A1 Dec. 5, 2002

(30) Foreign Application Priority Data
May 30, 2001 (JP) ......................... 2001-162924

(51) Int. Cl.[7] .................. G05B 19/40; H02P 8/00
(52) U.S. Cl. ......................... 318/685; 318/696
(58) Field of Search .......................... 318/685, 696

(56) References Cited

U.S. PATENT DOCUMENTS

| | | | | |
|---|---|---|---|---|
| 4,551,665 A | * | 11/1985 | Antognini et al. | 318/696 |
| 5,289,098 A | * | 2/1994 | Shinozaki | 318/696 |
| 5,883,483 A | * | 3/1999 | Nagata et al. | 318/696 |
| 6,262,554 B1 | * | 7/2001 | Kojima et al. | 318/685 |
| 2003/0117100 A1 | * | 6/2003 | Pigott et al. | 318/685 |

* cited by examiner

Primary Examiner—Robert E. Nappi
Assistant Examiner—Patrick Miller
(74) Attorney, Agent, or Firm—Adams & Wilks

(57) ABSTRACT

To prevent erroneous detection when a step motor is not rotated by a simple constitution. A control circuit controls to make a transistor to ON/OFF in a rotation detection period immediately after finishing a drive pulse in a state in which transistors is made ON. A comparator compares detection voltage produced at a connection point OUT2 between a resistor for detection and a coil with threshold voltage Vss, determines that a step motor is rotated when the detection voltage is equal to or lower than Vss and determines that the step motor is not rotated when the detection voltage is not equal to or lower than Vss. In this case, current ia does not flow immediately after finishing the drive pulse and therefore, the detection voltage produced at the connection point OUT2 becomes voltage having a polarity reverse to that of the threshold voltage Vss and does not become equal to or lower than Vss and therefore, the comparator determines that the step motor is not rotated.

4 Claims, 6 Drawing Sheets

ROTATION DETECTION PULSE

APPARATUS OF CONTROLLING TO ROTATE STEP MOTOR

BACKGROUND OF THE INVENTION

1. Field of the Invention

The present invention relates to an apparatus of controlling to rotate a step motor for driving to rotate a step motor and detecting presence or absence of rotation of the step motor.

2. Description of the Prior Art

Conventionally, there has bee used a step motor as a motor for driving to rotate a time hand or the like in an electronic timepiece.

FIG. 2 is a constitution view of a step motor conventionally used in an electronic timepiece. In FIG. 2, a step motor is provided with a stator 401, a coil 307 wound around the stator 401 and a rotor 402 of two poles arranged at inside of the stator 401. The stator 401 is formed with saturable portions 403 and 404.

When a drive pulse of a rectangular wave is supplied to the coil 307 and current i is made to flow in an arrow mark direction of FIG. 2, magnetic flux is generated in an arrow mark direction in the stator 401. Thereby, the saturable portions 403 and 404 are firstly saturated, thereafter, by interactive operation of a magnetic pole produced at the stator 401 and a magnetic pole of the rotor 402, the rotor 402 is rotated by 180 degrees in the counterclockwise direction. Thereafter, by making current having different polarities flow alternately to the coil 307, the above-described similar operation is carried out and the rotor 402 is rotated in the counterclockwise direction by 180 degrees respectively.

FIG. 3 and FIG. 4 are circuit diagrams showing an apparatus of controlling to rotate a step motor conventionally used in an electronic timepiece, constituting a circuit integrally constituted with a rotation drive circuit and a rotation detection circuit. FIG. 3 is an explanatory view of operation when the step motor is controlled to rotate by the rotation drive circuit and FIG. 4 is an explanatory view when rotation of the step motor is detected by the rotation detection circuit. Further, FIG. 5A shows a drive pulse used in driving to rotate the step motor and FIG. 5B shows a control pulse for detecting rotation used in detecting rotation of the step motor.

In FIG. 3 and FIG. 4, P-channel MOS transistors 301 and 302 and N-channel MOS transistors 303 and 304 are constituent elements of a motor drive circuit and a coil 307 of a step motor is connected between a point of connecting sources of the transistor 301 and the transistor 303 and a point of connecting sources of the transistor 302 and the transistor 304.

Meanwhile, N-channel MOS transistors 303 through 306, a resistor 308 for detection connected in series with the transistor 305 and a resistor 309 for detection connected in series with the transistor 306 and a comparator 310 are constituent elements of the rotation detection circuit.

Gates of the respective transistors 301 through 306 are connected in a control circuit 312.

A point OUT2 for connecting the resistor 308 for detection and the coil 307 and a point OUT1 for connecting the resistor 309 for detection and the coil 307 are connected to an input portion of the comparator 310. Further, the input portion of the comparator 310 is inputted with threshold voltage Vss.

In the above-described constitution, when a drive pulse P1 of FIG. 5A is supplied to an input portion Vi of a control circuit 312, by control of the control circuit 312, as shown by FIG. 3, the transistors 302 and 303 are brought into an ON state. Thereby, current is made to flow to the coil 307 in an arrow mark direction and as shown by FIG. 2, the rotor 402 is rotated in the counterclockwise direction.

Meanwhile, there is provided a rotation detection period for detecting whether the step motor is rotated, immediately after a motor drive period.

During the rotation detection period, the input portion Vi of the control circuit 312 is supplied with rotation detection control pulse SP1 of FIG. 5B. In response to the rotation detection control pulse SP1, as shown by FIG. 4, the control circuit 312 controls to make the transistor 304 to ON/OFF in a state of making the transistors 303 and 306 ON.

At this occasion, detection voltage is outputted from the connection point OUT1 of the resistor 309 for rotation detection and the coil 307. As the detection voltage, there is provided a signal having a waveform as shown by FIG. 7($a$). In FIG. 7($a$), there is generated detection voltage on a lower side of VDD when the rotor 42 is oscillated in the counterclockwise direction and there is generated detection voltage on an upper side of VDD when the rotor 42 is oscillated in the clockwise direction.

When the rotor 402 is rotated, there is provided detection voltage equal to or lower than predetermined threshold voltage (Vss according to the conventional example) and a rotation detection signal Vs at a high level is outputted from the comparator 310. When the rotor 402 is not rotated, the detection voltage is not equal to or lower than the threshold voltage and therefore, the rotation detection signal Vs at a low level is outputted from the comparator 310. Whether the step motor is rotated, can be detected from the rotation detection signal Vs. After detection of rotation has been finished, the transistors 303 and 304 are maintained in an ON state to thereby brake the step motor.

At a successive motor drive period, the following normal drive pulse P1 is supplied to the input portion Vi of the control circuit 312. The control circuit 312 controls the transistors 301 and 304 to an ON state and drive current in a direction reverse to that of the drive current (direction reverse to the arrow mark of FIG. 3) is made to flow at the coil 307 and the rotor 402 is rotated in the counterclockwise direction.

During the rotation detection period at this occasion, when the rotation detection control pulse SP1 is supplied to the input portion Vi of the control circuit 312, the transistors 304 and 305 are controlled to ON and the transistor 303 is controlled to ON/OFF. At this occasion, detection voltage is outputted from the connection point OUT2 of the resistor 308 and the coil 307 and a level thereof is determined by the comparator 310. Similar to the above-described,when the rotor 402 is rotated, the rotation detection signal Vs at the high level is outputted from the comparator 310 and when the rotor 402 is not rotated, the rotation detection signal Vs at the low level is outputted from the comparator 310. Whether the motor is rotated, can be detected from the rotation detection signal Vs. When detection of rotation has been finished, the transistors 303 and 304 are brought into an ON state to thereby brake the step motor.

According to the step motor having the above-described constitution, after the rotor 402 is driven by the drive pulse P1, the rotor 402 is freely oscillated centering on a position at which the rotor 402 is to be stopped. Immediately after finishing the drive pulse P1, free oscillation of the rotor 402 is considerable, further, by inertia, the rotor 402 is oscillated in a direction the same as a regular rotational direction (counterclockwise direction in the above-described conventional example). When the rotor 402 is oscillated in the counterclockwise direction, in FIG. 4, current is made to flow in the arrow mark direction.

Meanwhile, as shown by FIG. 6, an equivalent circuit of the respective transistors 303 through 306 is constituted by a series circuit of a switch 501 and a resistor 502 and a diode 503 and a capacitor 504 respectively connected in parallel with the series circuit and the respective transistors 303 through 306 are equivalently regarded as an element having a diode in one direction.

Therefore, even when the step motor is not rotated, within a predetermined period IT immediately after finishing the drive pulse P1, oscillation of the rotor 42 in the counter direction is considerable and therefore, as shown by FIG. 7(a), there is a case in which detection voltage equal to or lower than the threshold voltage Vss is provided. Thereafter, when the rotor 42 is oscillated in the clockwise direction, current is made to flow in the direction reverse to the arrow mark of FIG. 4 and owing to influence of the diode component, there is provided detection voltage restricted to a constant level on a side opposed to the threshold voltage Vss centering on VDD. Thereafter, the above-described operation is repeated.

That is, according to the detection voltage provided in the predetermined period IT immediately after finishing the drive pulse P1, regardless of whether the motor is rotated, detection voltage having a large peak value is produced at the resistor 309 for detection by large free oscillation of the rotor 402 and there poses a problem that it is erroneously detected that the step motor is rotating.

Conventionally, in order to resolve the problem, the rotation is not detected during the predetermined period IT immediately after finishing the drive pulse P1 and the rotation detection operation is carried out after elapse of the period IT. Although it can be prevented to erroneously detect nonrotation as rotation thereby, the period IT differs by the characteristic of the step motor and therefore, the period IT needs to be set for the respective motor and there poses a problem that selection of a material, arrangement or the like of a part becomes extremely complicated.

SUMMARY OF THE INVENTION

It is a problem of the invention to prevent erroneous detection when a step motor is not rotated by a simple constitution.

According to the invention, there is provided an apparatus of controlling to rotate a step motor characterized in that in an apparatus of controlling to rotate a step motor comprising a first and a second switch element connected in series, a third and a fourth switch element connected in series, a coil of the step motor connected between a point of connecting the first and the second switch elements and a point of connecting the third and the fourth switch elements, a first series circuit comprising a fifth switch element and a first element for detection connected in parallel with the first switch element, a second series circuit comprising a sixth switch element and a second element for detection connected in parallel with the third switch element, controlling means for driving to rotate the step motor by making a current flow to the coil by controlling the first through fourth switches in response to a drive pulse and controlling the first, the third, the fifth and the sixth switch elements in response to a control pulse for detecting rotation supplied immediately after finishing the drive pulse, and determining means for determining presence or absence of rotation of the step motor based on a result of comparing a voltage produced between the first and the second elements for detection and the coil and a threshold voltage wherein the controlling means makes ON the fifth or the sixth switch element on a side of producing a detection voltage in a direction reverse to a direction of the threshold voltage with a predetermined voltage as a reference between the first and the second elements for detection and the coil immediately after finishing the drive pulse, controls to make ON/OFF the first switch element after bringing the third switch element to an ON state when the fifth switch element is brought into the ON state and controls to make ON/OFF the third switch element after bringing the first switch element to the ON state when the sixth switch element is brought into the ON state, and the determining means determines presence or absence of the rotation of the step motor based on the result of comparing the voltage produced between the first element for detection and the coil and the threshold voltage when the fifth switch element is brought into the ON state and determines presence or absence of the rotation of the step motor based on the result of comparing the voltage produced between the second element for detection and the coil and the threshold voltage when the sixth switch element is brought into the ON state.

The controlling means makes ON the fifth or the sixth element for detection on the side of producing the detection voltage in the direction reverse to the direction of the threshold voltage between the first and the second elements for detection and the coil immediately after finishing the drive pulse, controls to make ON/OFF the first switch element after bringing the third switch element to the ON state when the fifth switch element is brought into the ON state and controls to make ON/OFF the third switch element after bringing the first switch element to the ON state when the sixth switch element is brought into the ON state. The determining means determines presence or absence of rotation of the step motor based on the result of comparing the voltage produced between the first element for detection and the coil when the fifth switch element is brought into the ON state and determines presence or absence of the rotation of the step motor based on the result of comparing the voltage produced between the second element for detection and the coil and the threshold voltage when the sixth switch element is brought into ON state.

Further, there may be constructed a constitution in which the first, the third, the fifth and the sixth switch elements are constituted by N-channel MOS transistors and the second and the fourth switch elements are constituted by P-channel MOS transistors.

Further, the first and the second elements for detection may be constituted by resistors.

BRIEF DESCRIPTION OF THE SEVERAL VIEWS OF THE DRAWINGS

A preferred form of the present invention is illustrated in the accompanying drawings in which.

DETAILED DESCRIPTION OF THE PREFERRED EMBODIMENTS

A detailed explanation will be given of embodiments of the invention in reference to the drawings as follows.

Figure 1:
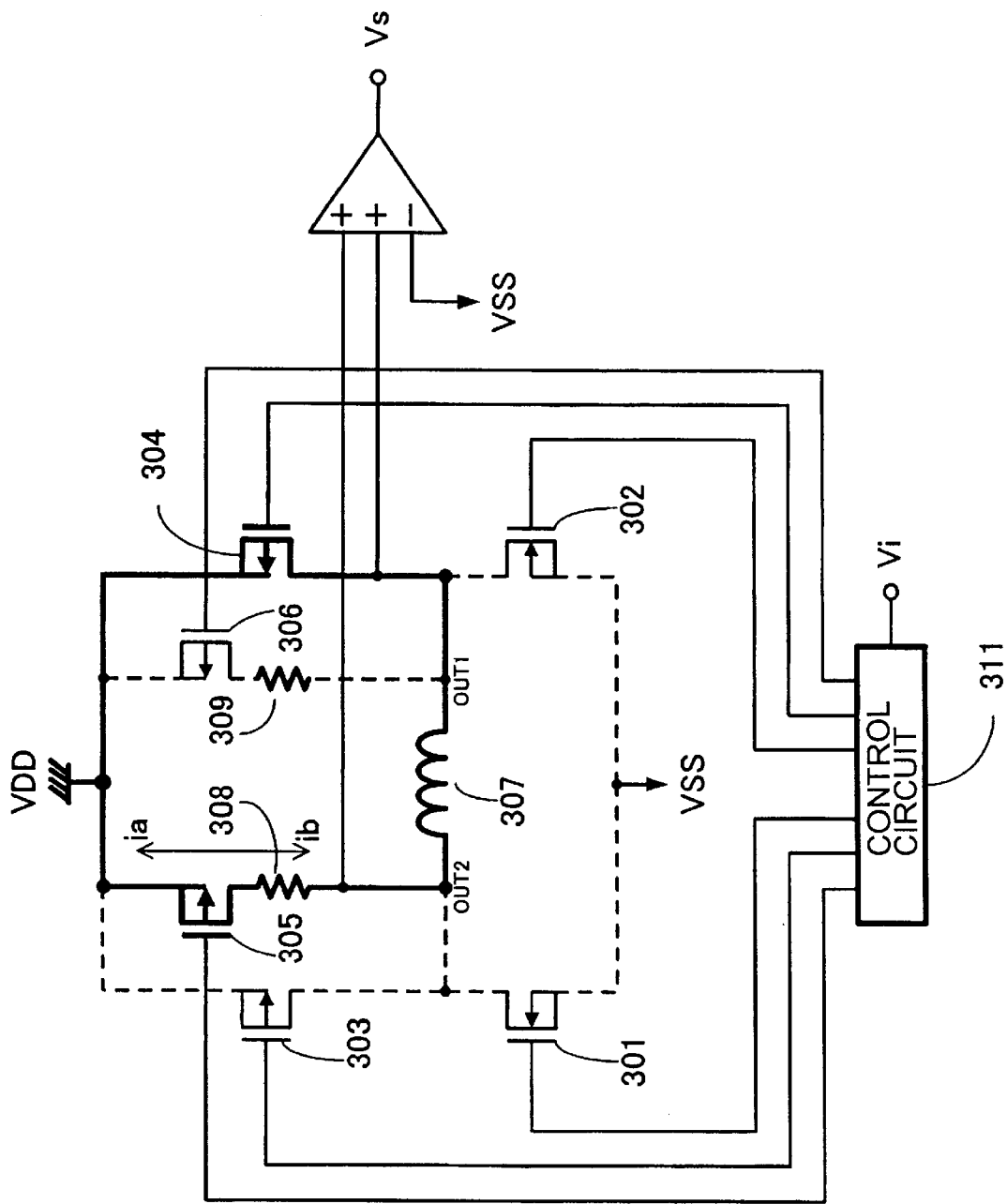
FIG. 1 is a circuit diagram of an apparatus of controlling to rotate a step motor according to an embodiment of the invention.

FIG. 1 is a circuit diagram showing an apparatus of controlling to rotate a step motor according to an embodiment of the invention, constructing a circuit constitution integrated with a rotation drive circuit and a rotation detection circuit. Further, FIG. 1 is an explanatory view when rotation of the step motor is detected by the rotation detection circuit.

Figure 3:
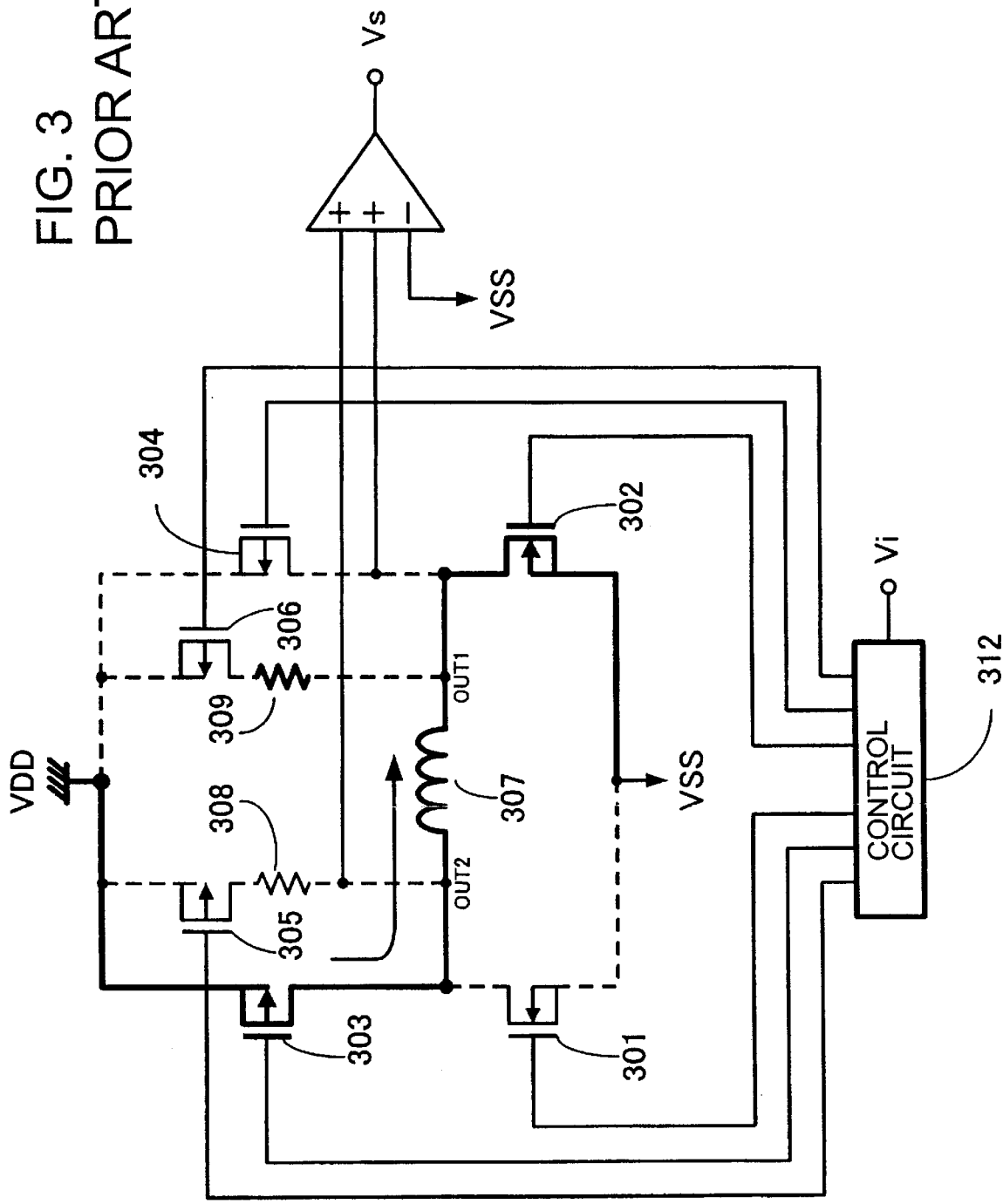
FIG. 3 is a circuit diagram of a conventional apparatus of controlling to rotate a step motor.
Figure 4:
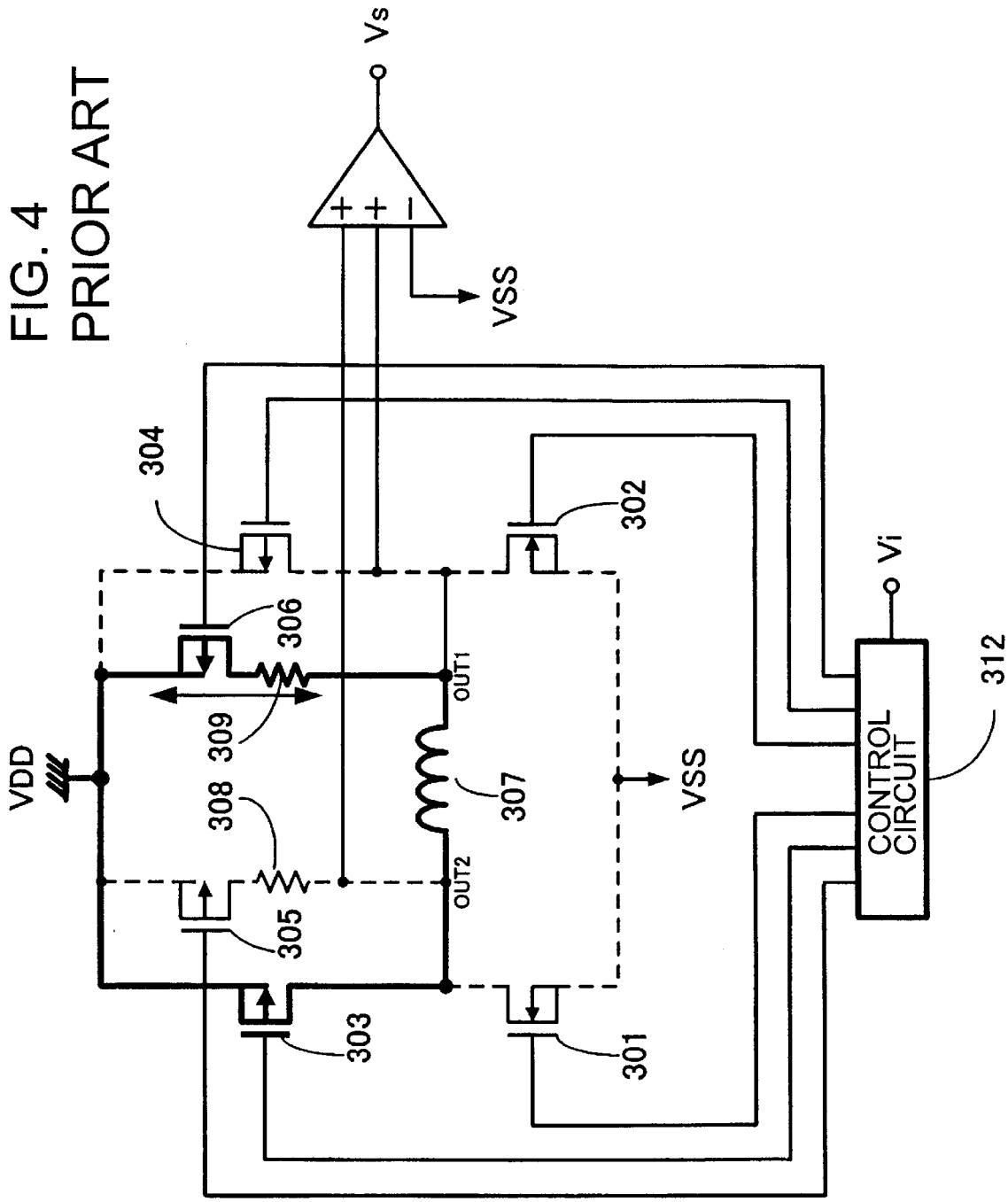
FIG. 4 is a circuit diagram of a conventional apparatus of controlling to rotate a step motor.

Further, portions the same as those of FIG. 3 and FIG. 4 are attached with the same notations and a difference between the rotation control apparatus of FIG. 1 and the rotation control apparatus of FIG. 3 and FIG. 4 resides in a difference between a control circuit 311 and the control circuit 312 and the other portions stays to be the same.

In FIG. 1, between a positive side power source terminal VDD (ground potential) and a negative side power source terminal Vss, there are provided the series of circuit the N-channel MOS transistor 303 and the P-channel MOS transistor 301 sources of which are commonly connected and the series circuit of the N-channel MOS transistor 304 and the P-channel MOS transistor 302 sources of which are commonly connected. The respective series circuits are connected in parallel.

The coil 307 of the step motor is connected between the connection point of the transistor 301 and the transistor 303 and the connection point between the transistor 302 and the transistor 304.

Between the drain and the source of the transistor 303, there is connected a first series circuit connected in series with the N-channel MOS transistor 305 and the resistor 308 for detection, further, between the drain and the source of the transistor 304, there is connected a second series circuit connected in series with the N-channel MOS transistor 306 and the resistor 309 for detection.

In this case, the transistor 303 constitutes a first switch element, the transistor 301 constitutes a second switch element, the transistor 304 constitutes a third switch element, the transistor 302 constitutes a fourth switch element, the transistor 305 constitutes a fifth switch element, the transistor 306 constitutes a sixth switch element, the resistor 308 for detection constitutes a first detection element and the resistor 309 for detection constitutes a second detection element.

At the input portion of the comparator 310 for determining whether the step motor is rotated, there are connected the connection point OUT2 of the resistor 308 for detection and the coil 307 and the connection point OUT1 of the resistor 309 for detection and the coil 307 and there is inputted predetermined threshold voltage (Vss according to the embodiment). The comparator 310 determines whether the step motor is rotated, by whether voltages produced at the connection points OUT1 and OUT2 are equal to or lower than the threshold voltage Vss. In this case, the comparator 310 constitutes determining means.

The gates of the respective transistor 301 through 306 are connected to the control circuit 311 for controlling the transistors 301 through 306 in response to a signal inputted to the input portion Vi. The control circuit 311 constitutes controlling means.

The transistors 301 through 304 are constituent elements of the motor drive circuit and transistors 303 through 306, the resistors 308 and 309 for detection, the comparator 310 and the control circuit 311 are constituent elements of the rotation detection circuit. Further, the transistor 303 and 304 and the control circuit 311 are used as constituent elements of both of the motor drive circuit and the rotation detection circuit.

Figure 2:
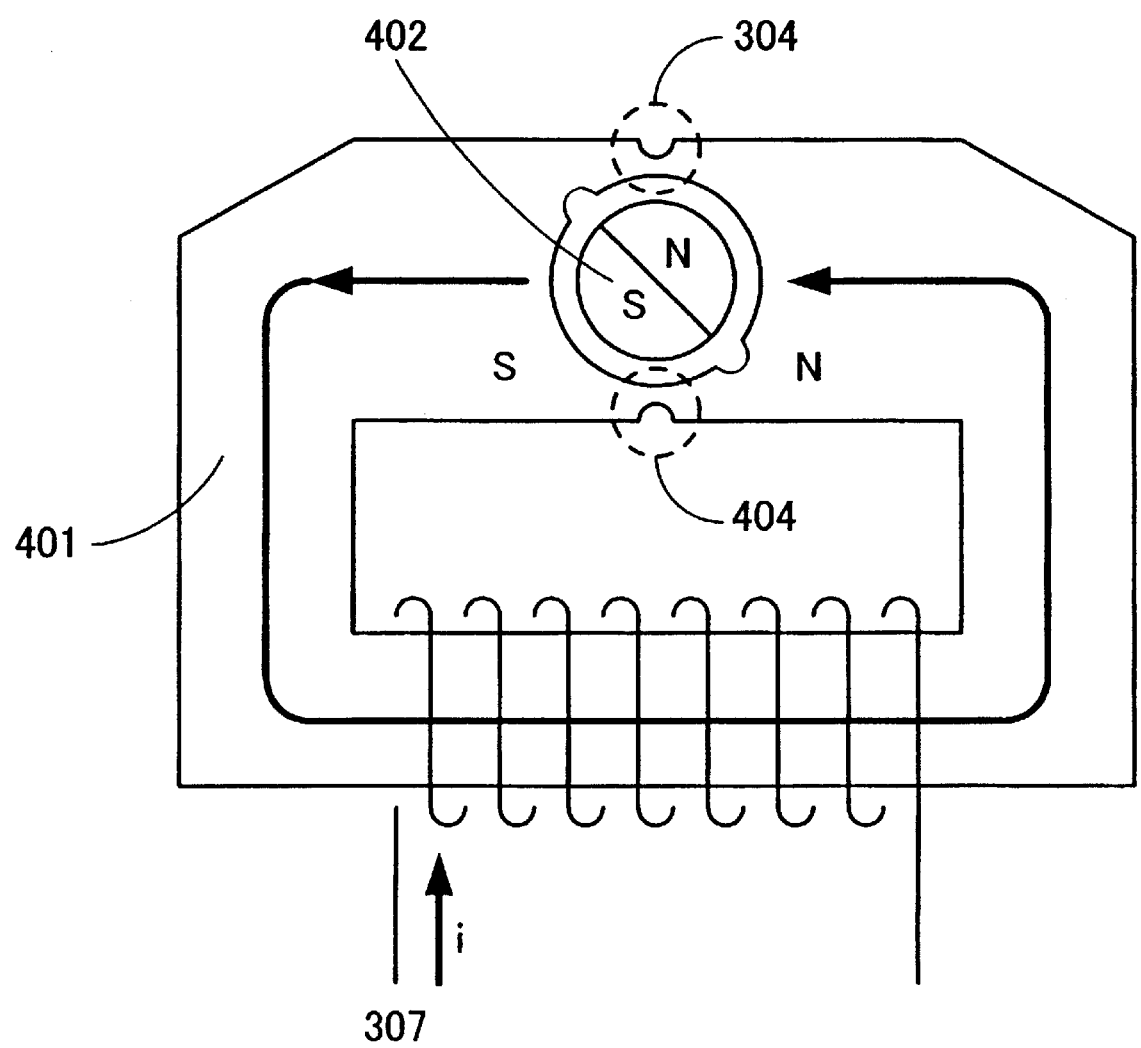
FIG. 2 is a constitution view of a general step motor.
Figure 5A:
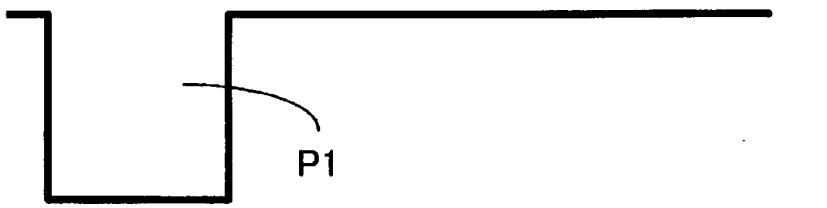
FIGS. 5A and 5B illustrate timing charts of a signal used for an apparatus of controlling to rotate a step motor.

According to the apparatus of controlling to rotate the step motor constituted as described above, during the motor drive period, the drive pulse P1 of FIG. 5A is inputted to the input portion Vi of the control circuit 311. In response to the drive pulse P1, during a time period in which the drive pulse P1 continues, as shown by FIG. 3, the control circuit 311 controls the transistors 302 and 303 to an ON state. Thereby, current is made to flow in the coil 307 in the arrow mark direction and as shown by FIG. 2, the rotor 402 is rotated in the counterclockwise direction.

Figure 5B:
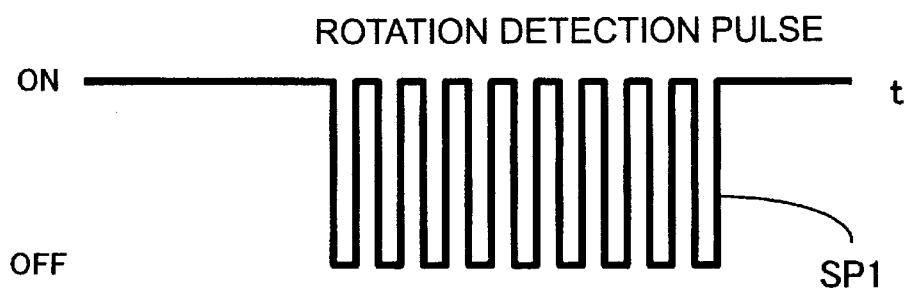

Meanwhile, there is provided the rotation detection period for detecting whether the step motor is rotated, immediately after finishing the motor drive pulse period. During the rotation detection period, the input portion Vi of the control circuit 311 is inputted with the control pulse SP1 for detecting rotation of FIG. 5B. In response to the control pulse SP1 for detecting rotation, as shown by FIG. 1, during a time period in which the control pulse SP1 for detecting rotation continues, in a state in which the transistors 304 and 305 are made ON, the control circuit 311 controls the transistor 303 to ON/OFF in accordance with respective very small pulses constituting the control pulse SP1 for detecting rotation to thereby control to switch the transistor 303. During the rotation detection time period, when there is provided detection voltage equal to or lower than the threshold voltage Vss, it is determined that the step motor is rotated and when there is not provided the detection voltage equal to or lower than the threshold voltage Vss, it is determined that the step motor is not rotated.

Figure 6:
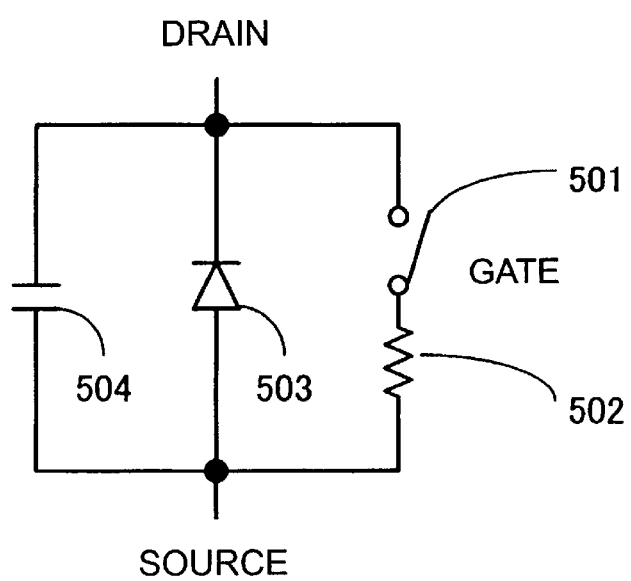
FIG. 6 is an equivalent circuit diagram of a general N-channel MOS transistor.

Meanwhile, as shown by FIG. 6, the equivalent circuit of the respective transistors 303 through 306 is constituted by the series circuit of the switch 501 and the resistor 502 and the diode 503 and the capacitor 504 respectively connected in parallel with the series circuit and the respective transistors 303 through 306 are equivalently regarded as the element having the diode in one direction.

After the rotor 402 has been rotated in the counterclockwise direction by the drive pulse, when the rotor 402 is oscillated by inertia in the counterclockwise direction even immediately after finishing the drive pulse P1, in FIG. 1, current ib is made to flow and therefore, the detection voltage is produced on the upper side of VDD, that is, in a direction reverse to the threshold voltage Vss with the predetermined voltage VDD as the reference. Further, the detection voltage is restricted to be equal to or smaller than a constant value by the equivalent diode component.

Figure 7A:
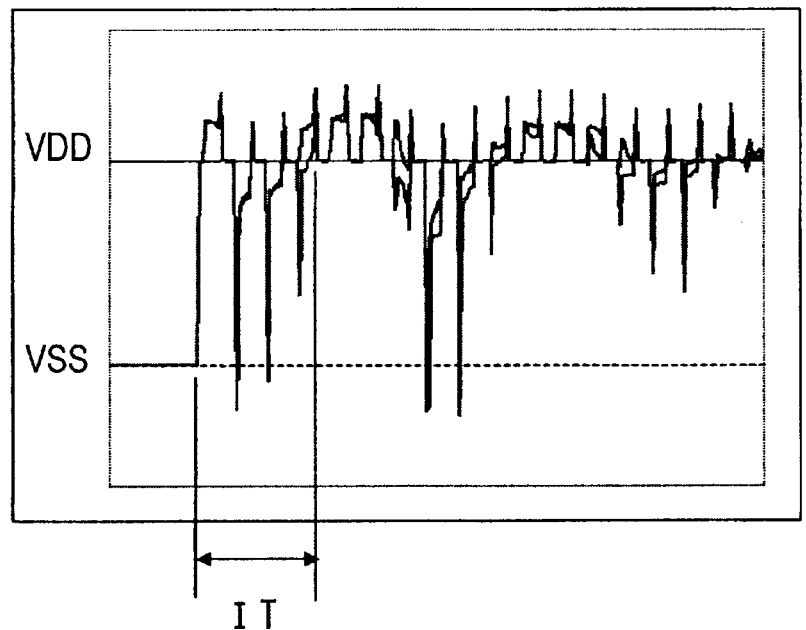
FIGS. 7A and 7B illustrate waveform diagrams of detection voltage in an apparatus of controlling to rotate a step motor.
Figure 7B:
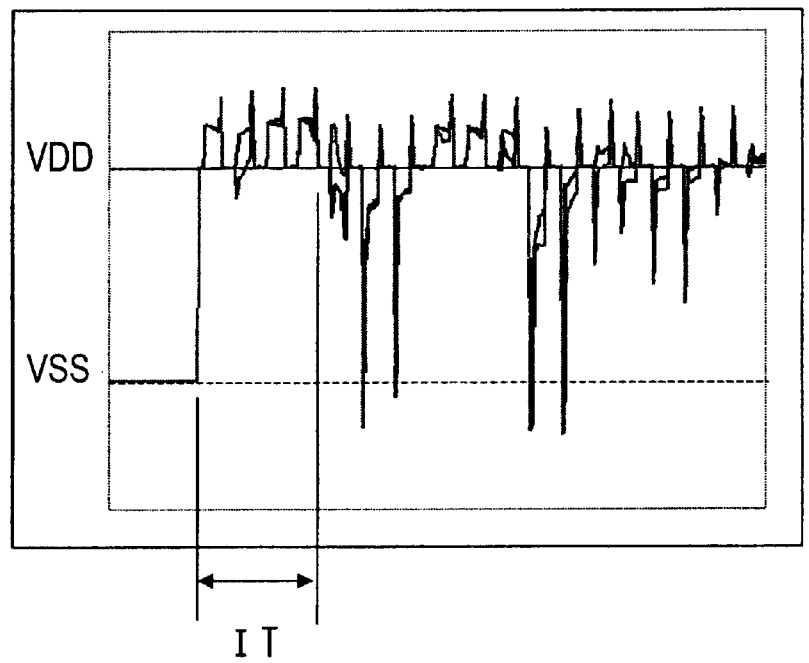

Therefore, during the period IT immediately after finishing the drive pulse P1, according to the conventional example shown in FIG. 4, there is a possibility that there is provided the detection voltage equal to or lower than the threshold voltage Vss even when the step motor is not rotated, however, according to the embodiment, as shown by FIG. 7B, detection voltage produced at the connection point OUT2 between the resistor 308 for detection and the coil 307, is produced on the reverse side of the threshold voltage Vss (on a side of a polarity reverse to that of the threshold voltage Vss according to the embodiment) with the predetermined voltage VDD as a reference and is restricted to a constant level by the equivalent diode.

Thereafter, when the rotor 402 is oscillated in the clockwise direction, current ia of FIG. 1 is made to flow and by influence of the diode component, detection voltage is provided on the side of the threshold voltage Vss (on a side of a polarity the same as that of the threshold voltage Vss according to the embodiment) with the predetermined voltage VDD as a reference.

When the rotor 42 is rotated, the rotor 402 is oscillated significantly and therefore, large electro motive force is produced and the detection voltage becomes equal to or lower than the predetermined threshold voltage Vss. The comparator 310 determines presence or absence of rotation of the step motor based on a result of comparing voltage produced between the resistor 308 for detection and the coil 307, and the threshold voltage Vss. In this case, since the detection voltage becomes equal to or lower than the threshold voltage Vss, the comparator 310 determines that the step motor is rotating and outputs the rotation detection signal Vs at a high level.

When the rotor 402 is not rotated, oscillation of the rotor 402 is attenuated and electro motive force is reduced and therefore, the detection voltage does not become equal to or lower than the threshold voltage Vss. Therefore, the rotation detection signal Vs at a lower level is outputted from the comparator 310. Thereby, whether the step motor is rotated, can be detected.

During the rotation detection period, by repeating the above-described operation, when threshold voltage equal to or lower than the threshold voltage Vss is provided, it is determined that the step motor is rotating and when the detection voltage equal to or lower than the threshold voltage Vss is not provided, it is determined that the step motor is not rotated.

Further, after finishing the rotation detection period, the transistors 303 and 304 are maintained in an ON state to thereby brake the step motor.

During a successive motor drive period, the drive pulse P1 is newly supplied to the input portion Vi of the control circuit 311. In response to the drive pulse P1, the control circuit 311 controls the transistors 301 and 304 to the ON state, thereby, the drive current in a direction reverse to that of the above drive current (direction reverse to the arrow mark of FIG. 3) is made to flow in the coil 307 and the rotor 402 is rotated in the counterclockwise direction. During the rotation detection period in this case, the control circuit 311 controls the transistors 303 and 306 to the ON state and controls the transistor 304 to ON/OFF to thereby switch the transistor 304.

Also in this case, similar to the above-described, during the period IT, the detection voltage is restricted and rotation or nonrotation of the step motor is detected by detection voltage produced thereafter. That is, during the rotation detection period, presence or absence of rotation is determined by comparing the detection voltage produced at the connection point OUT1 between the resistor 309 for detection and the coil 307, and the threshold voltage Vss. When the rotor 402 is rotated, the detection voltage at the connection point OUT1 becomes equal to or lower than the threshold voltage Vss and therefore, the rotation detection signal Vs at the high level is outputted from the comparator 310. When the rotor 402 is not rotated, the detection voltage at the connection point OUT1 does not become equal to or lower than the threshold voltage Vss and therefore, the rotation detection signal Vs at the low level is outputted from the comparator 310. Thereby, whether the step motor is rotated, can be detected. After detection of rotation has been finished, the transistors 303 and 304 are maintained at the ON state to thereby brake the step motor.

Further, although according to the above-described embodiment, an explanation has been given of an example of an apparatus of driving to rotate the rotor 42 in a counterclockwise direction in driving to rotate the motor, in the case of an apparatus of driving to rotate the rotor 42 in the clockwise direction, during the period IT immediately after finishing the drive pulse P1, the rotor 42 is oscillated in the clockwise direction. Therefore, there maybe constructed a constitution in which in the motor drive period, in response to the drive pulse P1, the transistors 302 and 303 are driven to the ON state and during the rotation detection period, immediately after finishing the drive pulse P1, the transistors 303 and 306 are brought into the ON state and the transistor 304 is controlled to ON/OFF. Further, there may be constructed a constitution in which during the successive motor drive period, in response to the drive pulse P1, the transistors 301 and 304 are driven to the ON state and during the rotation detection period, immediately after finishing the drive pulse P1, the transistors 304 and 305 are brought into the ON state and the transistor 303 is controlled to ON/OFF.

That is, immediately after finishing the drive pulse P1, the transistors 305 and 306 on a side in which detection voltage having a polarity reverse to that of the threshold voltage Vss is produced between the transistors 305 and 306 and the coil 307, are made ON and when the transistor 305 is brought into the ON state, the transistor 304 is brought into the ON state and the transistor 303 is controlled to ON/OFF and when the transistor 306 is brought into the ON state, the transistor 303 is brought into the ON state and the transistor 304 is controlled to ON/OFF. Thereby, erroneous detection during the period IT can be prevented.

As described above, according to the embodiment of the invention, there is provided an apparatus of controlling to rotate a step motor characterized in that in an apparatus of controlling to rotate a step motor comprising the transistors 303 and 301 connected in series, the transistors 304 and 302 connected in series, the coil 307 of the step motor connected between a point of connecting the transistors 303 and 301 and a point of connecting the transistors 304 and 302, a first series circuit comprising the transistor 305 and the resistor 308 for detection connected in parallel with the transistor 303, a second series circuit comprising the transistor 306 and the resistor 309 for detection connected in parallel with the transistor 304, the control circuit 312 for driving to rotate the step motor by making a current flow to the coil 307 by controlling the transistors 301 through 304 in response to the drive pulse P1 and controlling the transistors 303, 304, 305 and 306 in response to the control pulse SP1 for detecting rotation supplied immediately after finishing the drive pulse P1, and the comparator for determining presence or absence of rotation of the step motor based on a voltage produced between the resistors 308 and 309 for detection and the coil 307 and wherein the control circuit 311 makes ON the transistor 305 or the transistor 306 on a side of producing a detection voltage in a direction reverse to a direction of the threshold voltage VSS with the predetermined voltage VDD as a reference between the resistors 308 and 309 for detection and the coil 307 immediately after finishing the drive pulse P1, controls to make ON/OFF the transistor 303 after bringing the transistor 304 to an ON state when the transistor 305 is brought into the ON state and controls to make ON/OFF the transistor 304 after bringing the transistor 303 to the ON state when the transistor 306 is brought into the ON state and the comparator 310 determines presence or absence of the rotation of the step motor based on the result of comparing the voltage produced between the resistor 308 for detection and the coil 307 and the threshold voltage when the transistor 305 is brought into the ON state and determines presence or absence of the rotation of the step motor based on the result of comparing the voltage produced between the resistor 309 for detection and the coil 307 and the threshold voltage when the transistor 306 is brought into the ON state.

Therefore, erroneous detection in the case in which the step motor is not rotated can be prevented by a simple constitution. That is, the detection voltage provided immediately after finishing the drive pulse P1 is produced in the direction reverse to the direction of the threshold voltage Vss and therefore, even in the case in which although the step motor is not rotated but the electro motive voltage of the step motor becomes high, the voltage is not detected and the concern of erroneous detection is eliminated.

Further, when a degree of adhering a part constituting the step motor is poor, or a part having large magnetic resistance is used, brake force after finishing the drive pulse is weakened and a period of providing large electromotive force is prolonged even when the motor is not rotated, however, according to the embodiment, even a part having large magnetic resistance can be used, further, it is not necessary to increase the degree of adhering a part and therefore, there is achieved an effect of facilitating design.

According to the invention, detection voltage in the case of not rotating a step motor can be restrained to be low by simple constitution. Therefore, even when there is a dispersion in a part of a motor, rotation thereof can be detected accurately.

What is claimed is:

1. An apparatus for controlling rotation of a step motor comprising: a first and a second switch element connected in series, a third and a fourth switch element connected in series, a coil of the step motor connected between a first connection point of the first and second switch elements and a second connection point the third and the fourth switch elements, a first series circuit comprising a fifth switch element and a first element for detection connected in parallel with the first switch element, a second series circuit comprising a sixth switch element and a second element for detection connected in parallel with the third switch element, controlling means for driving to rotate the step motor by making a current flow to the coil by controlling the first through the fourth switches in response to a drive pulse and controlling the first, the third, the fifth and the sixth switch elements in response to a control pulse for detecting rotation supplied immediately after finishing the drive pulse, and determining means for determining presence or absence of rotation of the step motor based on a result of comparing a voltage produced between the first and the second elements for detection and the coil and a threshold voltage:

wherein the controlling means makes ON the fifth or the sixth switch element on a side of producing a detection voltage in a direction reverse to a direction of the threshold voltage with a predetermined voltage as a reference between the first and the second elements for detection and the coil immediately after finishing the drive pulse, controls to make ON/OFF the first switch element after bringing the third switch element to an ON state when the fifth switch element is brought into the ON state and controls to make ON/OFF the third switch element after bringing the first switch element to the ON state when the sixth switch element is brought into the ON state; and wherein the determining means determines presence or absence of the rotation of the step motor based on the result of comparing the voltage produced between the first element for detection and the coil and the threshold voltage when the fifth switch element is brought into the ON state and determines presence or absence of the rotation of the step motor based on the result of comparing the voltage produced between the second element for detection and the coil and the threshold voltage when the sixth switch element is brought into the ON state.

2. An apparatus of controlling to rotate a step motor according to claim 1; wherein the first, the third, the fifth and the sixth switch elements are constituted by N-channel MOS transistors and the second and the fourth switch elements are constituted by P-channel MOS transistors.

3. An apparatus of controlling to rotate a step motor according to claim 1; wherein the first and the second elements for detection are constituted by resistors.

4. An apparatus of controlling to rotate a step motor according to claim 2; wherein the first and the second elements for detection are constituted by resistors.

* * * * *